United States Patent
Park

(10) Patent No.: US 8,165,411 B2
(45) Date of Patent: Apr. 24, 2012

(54) METHOD OF AND APPARATUS FOR ENCODING/DECODING DATA

(75) Inventor: Chan-sik Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1260 days.

(21) Appl. No.: 11/852,566

(22) Filed: Sep. 10, 2007

(65) Prior Publication Data

US 2008/0089595 A1    Apr. 17, 2008

(30) Foreign Application Priority Data

Oct. 13, 2006    (KR) .................. 10-2006-0100005

(51) Int. Cl.
*G06K 9/36* (2006.01)

(52) U.S. Cl. ........................ 382/232; 382/236

(58) Field of Classification Search .......... 382/232–233, 382/236, 238, 244–247, 275; 375/240, 240.23; 341/107

See application file for complete search history.

(56) References Cited

U.S. PATENT DOCUMENTS

| | | | | |
|---|---|---|---|---|
| 6,081,552 A * | 6/2000 | Stevenson et al. | ............ | 382/275 |
| 7,630,563 B2 * | 12/2009 | Irvine et al. | .................... | 382/232 |
| 7,830,963 B2 * | 11/2010 | Holcomb | ..................... | 382/232 |

* cited by examiner

*Primary Examiner* — Duy M Dang

(74) *Attorney, Agent, or Firm* — Sughrue Mion, PLLC

(57) ABSTRACT

Provided is a method of and apparatus for compressing/decompressing data, in which lossless compression is applied to a raw data transfer mode in order to decompress data into high-quality data in a encoder/decoder (CODEC) system. A method of encoding data includes performing intraprediction within a current frame and performing interprediction between the current frame and a reference frame, applying lossless compression in input data in a raw data transfer mode in which raw data is transferred within an input frame, and comparing a predetermined parameter generated by the intraprediction and the interprediction with a predetermined parameter generated by the lossless compression, in order to select one of a prediction mode and a lossless compression mode.

11 Claims, 6 Drawing Sheets

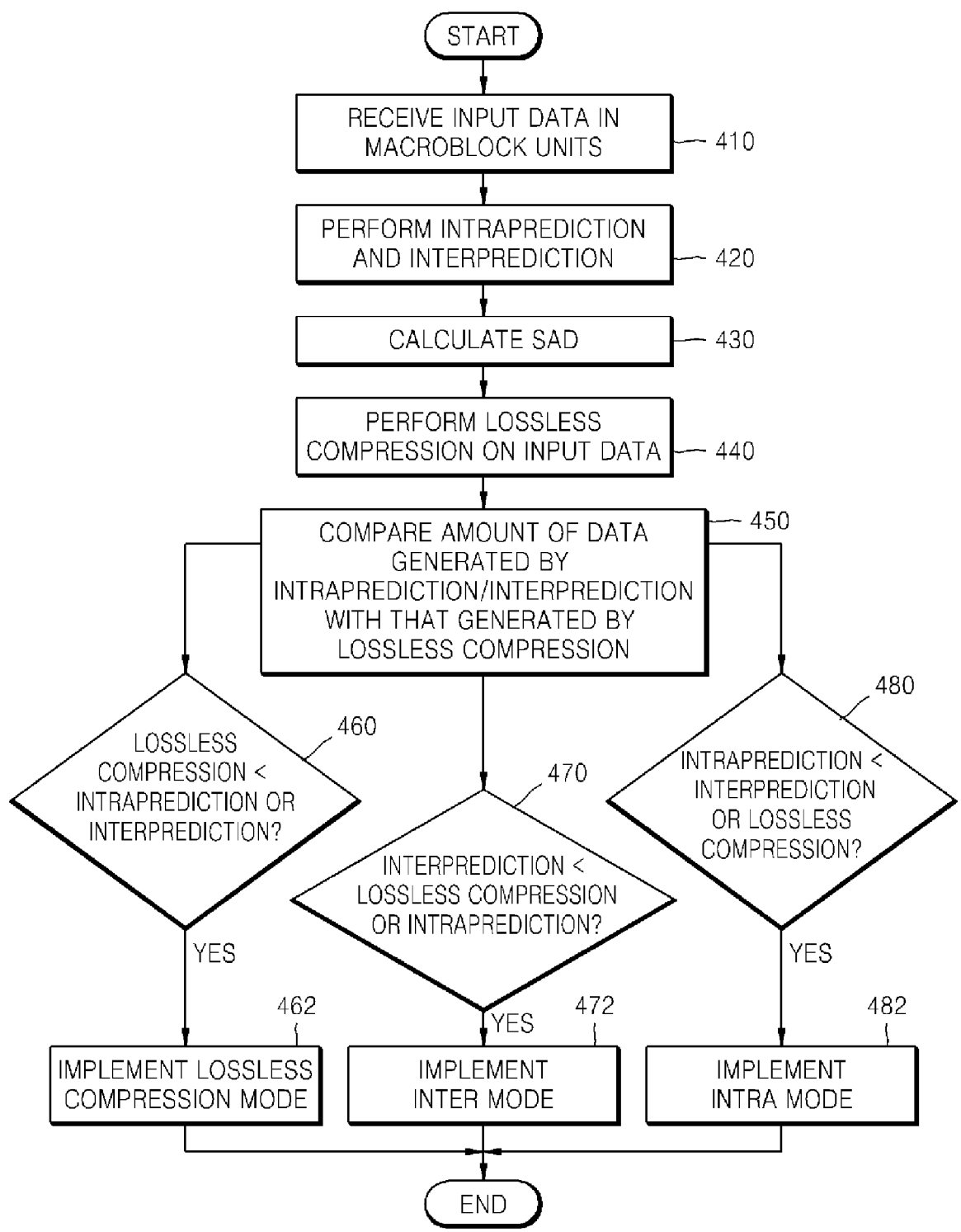

FIG. 5

| Bit precision indication bits(0 or 1)~384bits) | Y Start pel(8bits) | DPCM bits(8 or precision bits) | 8 or precision bits | . . . | 8 or precision bits |
|---|---|---|---|---|---|
| 8 or precision bits | DPCM bits(8 or precision bits) | 8 or precision bits | . . . | | |
| Cb Start pel(8bits) | DPCM bits(8 or precision bits) | 8 or precision bits | . . . | | |
| Cr Start pel(8bits) | DPCM bits(8 or precision bits) | 8 or precision bits | . . . | | |

METHOD OF AND APPARATUS FOR ENCODING/DECODING DATA

CROSS-REFERENCE TO RELATED PATENT APPLICATION

This application claims the benefit of Korean Patent Application No. 10-2006-0100005, filed on Oct. 13, 2006, in the Korean Intellectual Property Office, the disclosure of which is incorporated herein in its entirety by reference.

BACKGROUND OF THE INVENTION

1. Field of the Invention

Apparatuses and methods consistent with the present invention relates to an encoder/decoder (CODEC), and more particularly, to compressing/decompressing data, in which lossless compression is applied to a raw data transfer mode in order to decompress data into high-quality data in a CODEC system.

2. Description of the Related Art

The H.264 CODEC innovatively improves compression rate and display quality using more varied and complex techniques than related art video compression standards. For this reason, the H.264 CODEC, which is used as a substitute for related art video compression standards, is in the limelight as an application technique for digital multimedia broadcasting (DMB) or digital versatile discs (DVDs).

In the H.264 CODEC, video data is compressed by performing a prediction process on sample data in block units in order to obtain a prediction block composed of prediction samples, and transforming and quantizing a residue block obtained from prediction blocks.

Two methods are used for prediction: intraprediction and interprediction. Interprediction performs prediction by performing motion compensation/estimation with reference to a reference picture that has passed through an encoding/decoding process and deblocking filtering. Intraprediction performs prediction in a current picture using data of neighboring blocks that are already encoded. Video data compressed by passing through a prediction process and a transformation & quantization process is compressed again through an entropy coding process to become a bitstream conforming to the H.264 standard.

The H.264 CODEC improves video quality using intra pulse coded modulation (I_PCM) in which raw data of a specific macroblock is transferred without being compressed. However, a raw data transfer mode of the H.264 CODEC requires 3072 bits per macroblock in a 4:2:0 format. The raw data transfer mode, although providing best video quality, may not meet a threshold set by a user due to an excessive amount of bits used in mode decision and rate distortion optimization (RDO) or may not be selected in view of efficiency.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a method of and apparatus for encoding/decoding data, in which lossless compression is applied to a raw data transfer mode in order to decompress data into high-quality data in a CODEC system.

The present invention also provides a CODEC system that applies lossless compression to a raw data transfer mode.

According to one aspect of the present invention, there is provided a method of encoding data. The method includes performing intraprediction within a frame and performing interprediction between frames, applying lossless compression to input data in a raw data transfer mode in which raw data is transferred within an input frame, and comparing a predetermined parameter generated by the intraprediction and the interprediction with a predetermined parameter generated by the lossless compression, in order to select one of a prediction mode and a lossless compression mode.

According to another aspect of the present invention, there is provided a method of decoding data in which a bitstream that has been encoded by applying lossless compression to a raw data transfer mode is received and decoded. The method includes receiving the bitstream and decoding the received bitstream based on lossless compression data information, intra/inter mode information, and motion vector information included in the received bitstream.

According to another aspect of the present invention, there is provided an apparatus for encoding data. The apparatus includes an interprediction block performing interprediction on input data, an intraprediction block performing intraprediction on input data, a lossless compression block applying lossless compression to a raw data transfer mode included in the intraprediction block or a separate raw data transfer mode for input data, and a mode selection block comparing a cost generated by the intraprediction block and the interprediction block with a cost generated by the lossless compression block, in order to select one of a lossless compression mode of the interprediction or an intraprediction mode and a separate lossless compression mode.

According to another aspect of the present invention, there is provided a CODEC system. The CODEC system includes an encoding block implementing an intra mode and a raw data transfer mode with respect to input data and applying lossless compression in the raw data transfer mode in order to encode lossless compression data information, intra/inter mode information, and motion vector information together and a decoding block decoding a bitstream received from the encoding block based on the lossless compression data information, the intra/inter mode information, and the motion vector information included in the received bitstream.

BRIEF DESCRIPTION OF THE DRAWINGS

The above and other aspects of the present invention will become more apparent by describing in detail exemplary embodiments thereof with reference to the attached drawings in which:

FIG. 4 is a flowchart illustrating a method of encoding data using lossless compression for a raw data transfer mode according to an exemplary embodiment of the present invention; and FIG. 5 illustrates a signal format for lossless compression according to an exemplary embodiment of the present invention.

DETAILED DESCRIPTION OF EXEMPLARY EMBODIMENTS OF THE INVENTION

Hereinafter, exemplary embodiments of the present invention will be described in detail with reference to the accompanying drawings.

Figure 1:
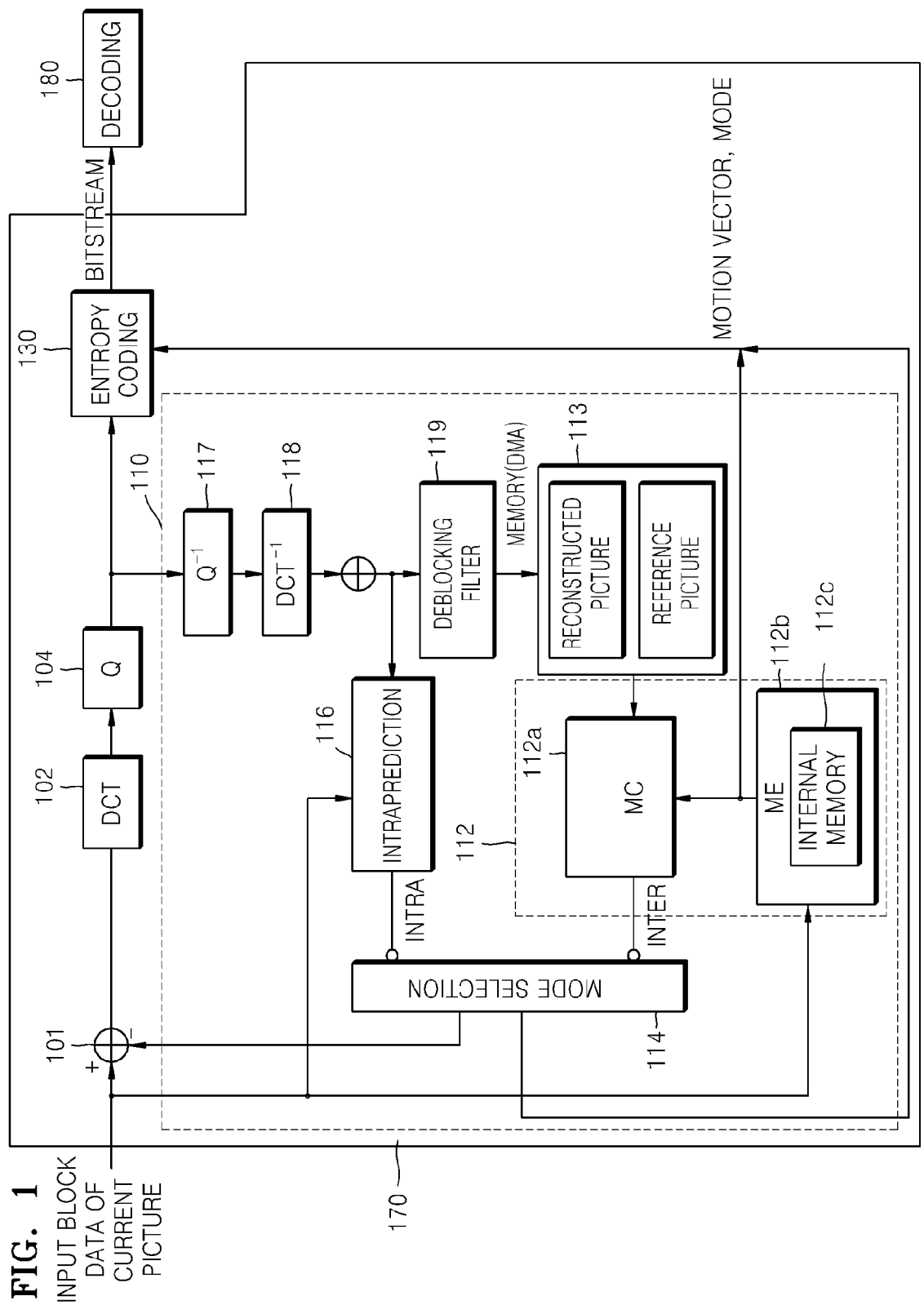
FIG. 1 is a block diagram of an apparatus for encoding/decoding data according to an exemplary embodiment of the present invention.

FIG. 1 is a block diagram of an apparatus for encoding/decoding data according to an exemplary embodiment of the present invention.

The apparatus illustrated in FIG. 1 includes an encoding block 170 and a decoding block 180.

The encoding block 170 includes a prediction block 110, a discrete cosine transformation (DCT) block 102, a quantization block 104, and an entropy-coding block 130.

The prediction block 110 performs a prediction process on sample data in block units in order to obtain a prediction block including prediction samples and performs interprediction and intraprediction. The intraprediction and/or the interprediction are performed depending on a picture's attribute such as an intra (I)-picture, a predictive (P)-picture, and a bi-predictive (B)-picture.

More specifically, an intraprediction block 116 implements an intra mode in which block prediction is performed using pixel data of a block that is adjacent to the prediction block within a picture that has already been decoded by an inverse quantization block 117 and an inverse DCT block 118. The intraprediction block 116 also implements a raw data transfer mode in which raw data of the original macroblock is transferred without being compressed. In particular, according to an exemplary embodiment of the present invention, lossless compression such as differential pulse coded modulation (DPCM) is applied to the raw data transfer mode and transmission is performed using a predetermined scanning method. In the DPCM, a current image is predicted using a previous prediction value and a difference between an actual image value and a prediction value is output as an encoding result.

An interprediction block 112 performs block prediction on a current picture using a reference picture that has been stored in a memory (DMA) 113 after passing through a deblocking filter 119. In other words, the interprediction block 112 performs prediction using information between pictures. The interprediction block 112 includes a motion estimation (ME) block 112b and a motion compensation (MC) block 112a. A reference picture or a reconstructed picture is stored in the memory 113.

The ME block 112b includes an internal memory 112c therein. An external memory is accessed through a bus, while the internal memory 112c can be accessed without using a bus and thus has no burden associated with a bus. ME involves searching in a previous frame for a macroblock that is most similar to a macroblock of a current frame using a predetermined measurement function in order to obtain a motion vector indicating a displacement between the macroblock of the current frame and the most similar macroblock of the previous frame.

As a representative example for searching for the most similar macroblock, a similarity between the macroblock of the current frame and a macroblock of the previous frame is calculated using a predetermined measurement method through pixel-by-pixel comparison within a predetermined search range.

As an example of the predetermined measurement method, absolute values of differences between pixel values of a macroblock in the current frame and pixel values of a macroblock in the search range are obtained, and a macroblock having the minimum sum of the absolute values of the differences is determined as the most similar macroblock.

More specifically, a similarity between a macroblock of the current frame and a macroblock of the previous frame is determined using a similarity value calculated using pixel values of the macroblock of the current frame and pixel values of the macroblock of the previous frame, i.e., using a matching criterion value. The matching criterion value is calculated using a predetermined measurement function such as a sum of absolute differences (SAD), a sum of absolute transformed differences (SATD), or a sum of squared differences (SSD).

A mode selection block 114 compares costs that are output from the intraprediction block 116 and the interprediction block 112 with costs that are generated by a lossless compression mode in order to select one of a prediction mode and the lossless compression mode. Here, the cost may be the amount of data, an SAD or/and a motion vector.

Referring back to FIG. 1, a subtraction block 101 generates a differential sample between block data of the current picture and block data that is output from the prediction block 110.

The DCT block 102 performs a DCT on the differential sample that is output from the subtraction block 101.

The quantization block 104 quantizes a DCT coefficient that is output from the DCT block 102.

The entropy-coding block 130 performs encoding on video data that is quantized by the quantization block 104 using mode information generated by the mode selection block 114 and a motion vector generated by the MC block 112a and outputs the encoded data to the decoding block 180, together with lossless compression data information, intra/inter mode information, and motion vector information.

The decoding block 180 receives a bitstream from the encoding block 170. The decoding block 180 decodes the received bitstream based on the lossless compression data information, the intra/inter mode information, and the motion vector information included in the received bitstream. The lossless compression data information includes a lossless compression mode and lossless compression data.

Figure 2:
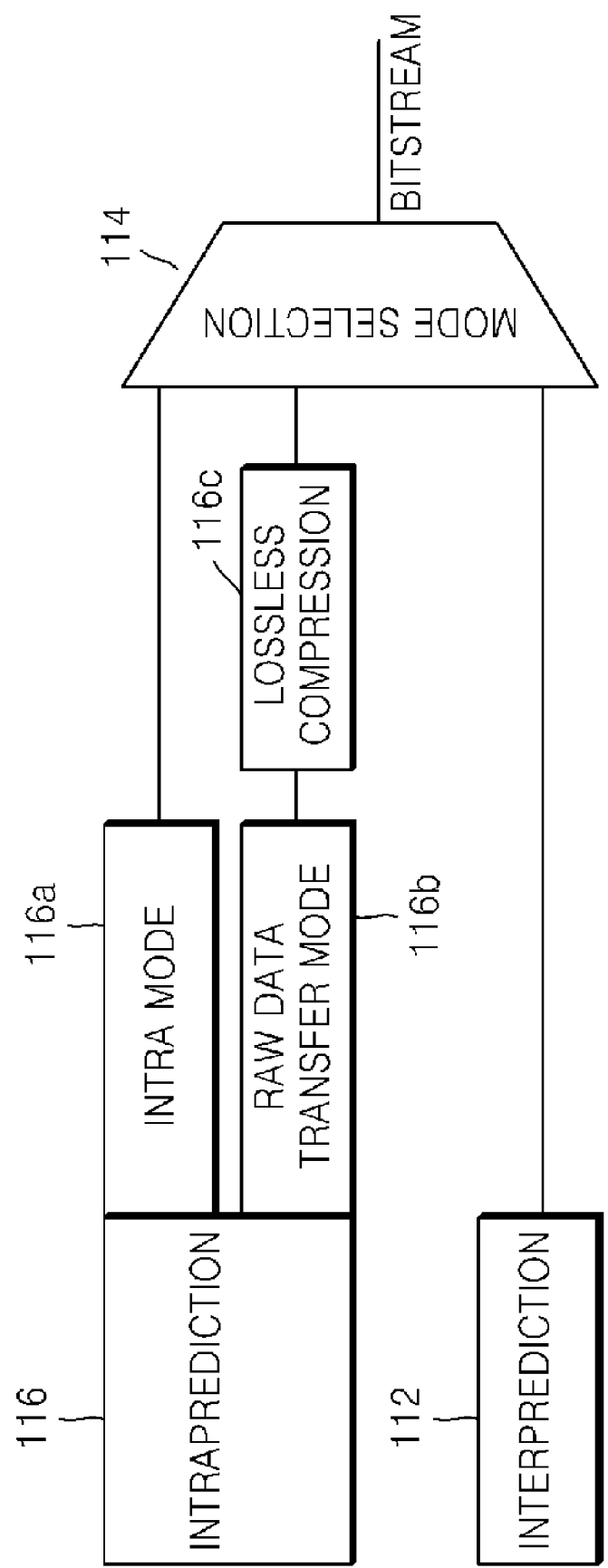
FIG. 2 is a detailed block diagram of encoding using prediction and lossless compression in the apparatus for encoding data illustrated in FIG. 1.

FIG. 2 is a detailed block diagram of encoding using prediction and lossless compression in the apparatus for encoding data illustrated in FIG. 1.

Referring to FIG. 2, the intraprediction block 116 includes an intra mode block 116a and a raw data transfer mode block 116b. The intra mode block 116a performs block prediction using pixel data of a block that is adjacent to a block to be predicted in a picture. The raw data transfer mode block 116b transfers raw data in the current pixel without compression. A lossless compression block 116c sequentially compresses and transfers pixels of the raw data that is generated by the raw data transfer mode block 116b in a predetermined order using correlations between adjacent pixels. In another exemplary embodiment of the present invention, the raw data transfer mode block 116b may exist independently of the intraprediction block 116 without being included in the intraprediction block 116 in order to generate raw data.

The interprediction block 112 performs block prediction using information between pictures.

The mode selection block 114 compares a cost that is generated by the intra mode block 116a or the lossless compression block 116c of the intraprediction block 116 with a cost, e.g., the amount of data, an SAD, or a motion vector, that is generated by the interprediction block 112 in order to select one of the prediction mode and the lossless compression mode. For example, when the amount of data generated by the lossless compression block 116c is smaller than that generated by the intra mode block 116a of the intraprediction block 116 or the interprediction block 112, the mode selection block 114 selects the raw data transfer mode block 116b to which lossless compression is applied. Thus, the mode selection block 114 can increase the probability of selecting a raw data transfer mode due to the efficiency in the amount of data resulting from lossless compression. In another exemplary embodiment of the present invention, the mode selection block 114 compares a cost generated by the intraprediction block 116 and the interprediction block 112 with a cost generated by the lossless compression block 116c in order to select one of a lossless compression mode of the interprediction or a lossless compression mode of the intraprediction and a separate lossless compression mode.

Figure 3A:
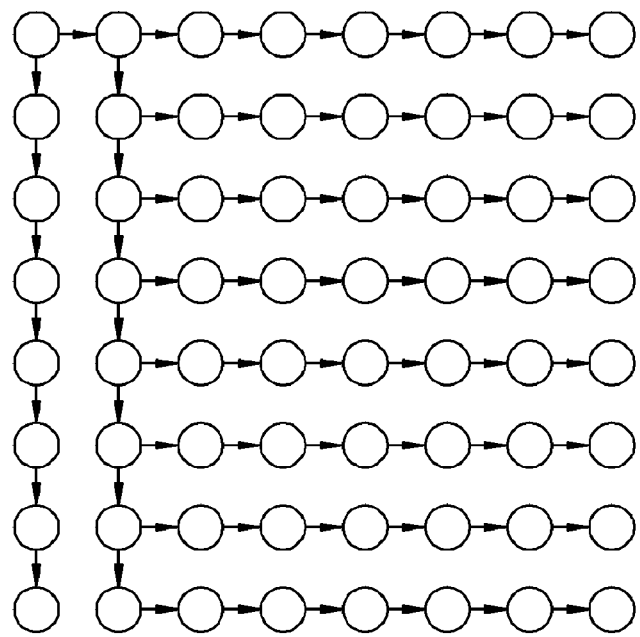
FIGS. 3A through 3C illustrate scanning methods for lossless compression according to an exemplary embodiment of the present invention.
Figure 3B:
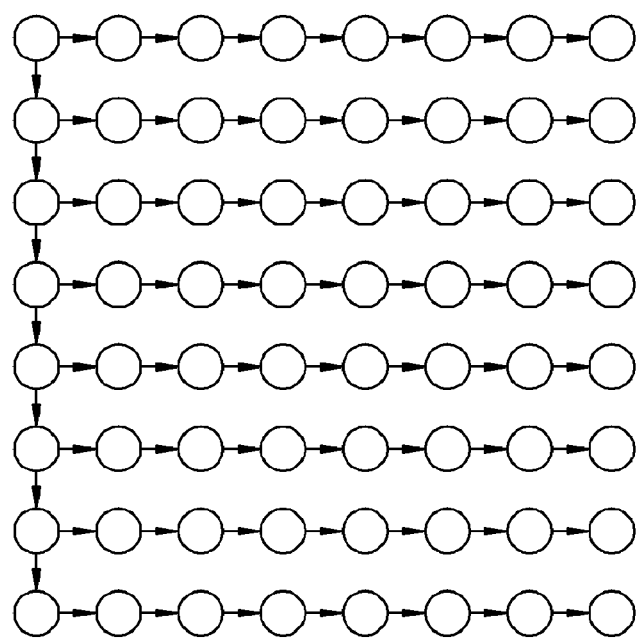
Figure 3C:
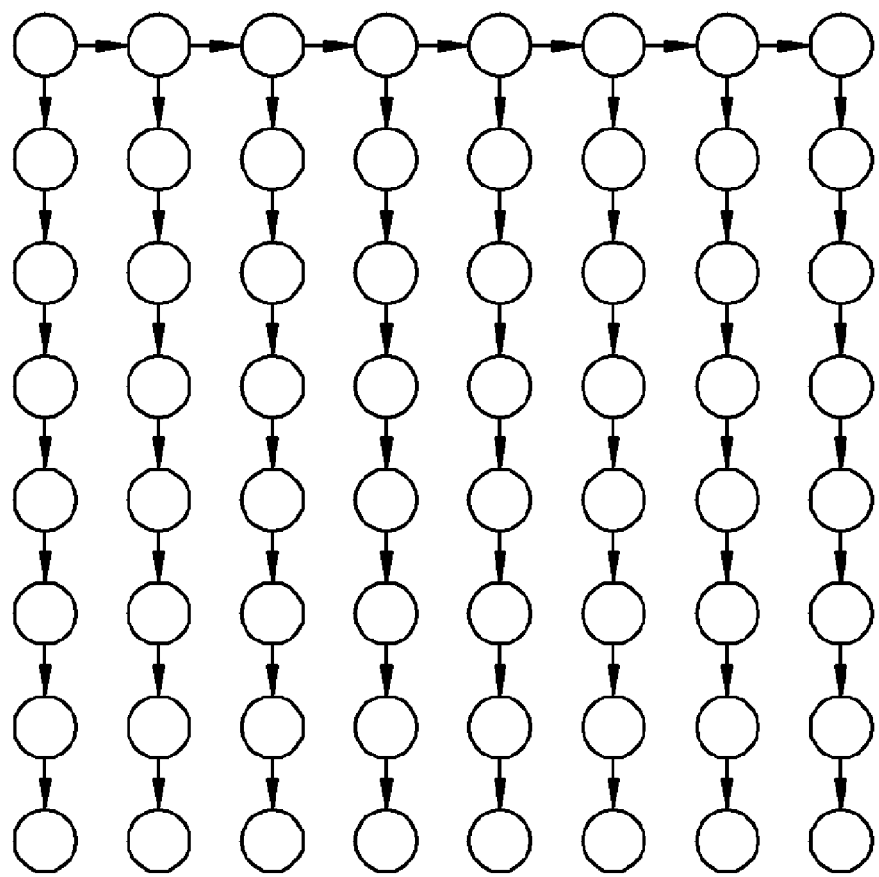

FIGS. 3A through 3C illustrate scanning methods for lossless compression according to an exemplary embodiment of the present invention.

The first pixel is transferred with a predetermined bit precision. The remaining pixels are lossless-compressed and transferred in a predetermined order using correlations between adjacent pixels.

Three scanning methods will be taken as examples in FIGS. 3A through 3C.

Referring to FIG. 3A, the first pixel is transferred with a predetermined bit precision. Pixels in the first row are lossless-compressed and transferred sequentially in the left-to-right direction. Pixels in the first column are lossless-compressed and transferred sequentially in the top-to-bottom direction. Pixels in the second column are also lossless-compressed and transferred sequentially in the top-to-bottom direction. Starting from the pixels in the second column, pixels in the second row through the last row are lossless-compressed and transferred sequentially in the left-to-right direction.

Referring to FIG. 3B, the first pixel is transferred with a predetermined bit precision. Pixels in the first row are lossless-compressed and transferred sequentially in the left-to-right direction. Pixels in the first column are lossless-compressed and transferred sequentially in the top-to-bottom direction. Starting from the pixels in the first column, pixels in the second row through the last row are lossless-compressed and transferred sequentially in the left-to-right direction.

Referring to FIG. 3C, the first pixel is transferred with a predetermined bit precision. Pixels in the first row are lossless-compressed and transferred sequentially in the left-to-right direction. Starting from the pixels in the first row, pixels in the first column through the last column are lossless-compressed and transferred sequentially in the top-to-bottom direction.

FIG. 4 is a flowchart illustrating a method of encoding data using lossless compression for a raw data transfer mode according to an exemplary embodiment of the present invention.

In operation 410, video or audio data is input in macroblock units.

Next, intraprediction and interprediction are performed on data in macroblock units that are input according to a predetermined procedure in operation 420, and an SAD for the intraprediction and interprediction is obtained in operation 430.

At this time, the intraprediction is separately performed in an intra mode and in a raw data transfer mode. A block prediction is performed on the input data in the intra mode and lossless compression is performed on the input data in the raw data transfer mode in operation 440.

A cost that is generated by the intra mode and lossless compression of intraprediction is compared with a cost that is generated by interprediction in order to select one of a prediction mode and a lossless compression mode in operation 450. The cost may be set to the amount of data or/and an SAD by a user.

For example, when the amount of data generated by lossless compression is smaller than that generated by the intra mode of intraprediction or interprediction in operation 460, the raw data transfer mode in which lossless compression is applied is implemented in operation 462.

When the amount of data generated by interprediction is smaller than that generated by lossless compression or the intra mode of intraprediction in operation 470, prediction of the inter mode is performed in operation 472.

When the amount of data generated by the intra mode of intraprediction or lossless compression is smaller than that generated by interprediction in operation 480, prediction of the intra mode is performed in operation 482.

Even when the amount of data generated by the intra mode or the inter mode is smaller than that generated by the lossless compression mode, a high-quality lossless compression mode may be selected using a user's threshold or weight factor.

FIG. 5 illustrates a signal format for lossless compression according to an exemplary embodiment of the present invention.

First, bit precision is determined by a user.

Next, indication bits are set based on the range of determined bit precision according to a lossless compression result. In other words, when the lossless compression result falls within the range of bit precision, an indication bit is set to "1". Referring to FIG. 5, a signal format for lossless compression is composed of indication data having the same number of bits as the number of pixels and is added to a header and lossless compression data. In other words, the signal format includes indication bits, start pixels (eight bits) of luminance-chrominance color components (Y, Cb, and Cr), and DPCM bits (eight or precision bits).

Meanwhile, the present invention can also be embodied as computer-readable information on a computer-readable recording medium. The computer-readable recording medium may be any data storage device that can store data which can be thereafter read by a computer system. Examples of computer-readable recording media include read-only memory (ROM), random-access memory (RAM), CD-ROMs, magnetic tapes, floppy disks, and optical data storage devices. The computer-readable recording medium can also be distributed over network of coupled computer systems so that the computer-readable code is stored and executed in a decentralized fashion.

As described above, according to exemplary embodiments of the present invention, by applying lossless compression to a raw data transfer mode in a CODEC, it is possible to improve a probability of selecting a raw data mode while maintaining display quality that is equivalent to that of a related art raw data transfer mode. Thus, the quality of the current frame can be improved by selecting the raw data mode. Moreover, since lossless block data serves as reference block data for a next prediction, the performance of interframe prediction can be improved. Furthermore, a lower bitrate than in raw data transfer of a related art CODEC is used and thus can be used for other applications in view of rate control (RC) or RDO, thereby allowing efficient compression.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A method of encoding data, the method comprising:
performing intraprediction within a current frame and performing interprediction between the current frame and a reference frame;
applying, by a processor, lossless compression to input data in a raw data transfer mode in which raw data is transferred within an input frame; and
comparing, by a processor, a parameter generated by the intraprediction and the interprediction with a parameter generated by the lossless compression, in order to select one of a prediction mode and a lossless compression mode.

2. The method of claim 1, wherein the lossless compression comprises performing a compression algorithm using correlations between adjacent pixels.

3. The method of claim 1, wherein the lossless compression comprises setting an initial value of each of a plurality of color components as a reference value and generating differential pulse code modulation data according to a scanning direction.

4. The method of claim 1, wherein a scanning method used in the lossless compression comprises:
transferring a first pixel with a bit precision; and
transferring remaining pixels sequentially in an order using correlations between adjacent pixels.

5. The method of claim 4, wherein the transferring the remaining pixels comprises lossless-compressing and transferring pixels in a first row sequentially in a left-to-right direction, lossless-compressing and transferring pixels in a first column sequentially in a top-to-bottom direction, lossless-compressing and transferring pixels in a second column sequentially in the top-to-bottom direction, and, starting from the pixels in the second column, lossless-compressing and transferring pixels in a second row through a last row sequentially in the left-to-right direction.

6. The method of claim 4, wherein the transferring the remaining pixels comprises lossless-compressing and transferring pixels in a first row sequentially in a left-to-right direction, lossless-compressing and transferring pixels in a first column sequentially in a top-to-bottom direction, and, starting from the pixels in the first column, lossless-compressing and transferring pixels in a second row through a last row sequentially in the left-to-right direction.

7. The method of claim 4, wherein the transfer of the remaining pixels comprises lossless-compressing and transferring pixels in a first row sequentially in a left-to-right direction and, starting from the pixels in the first row, lossless-compressing and transferring pixels in a first column through a last column sequentially in the top-to-bottom direction.

8. The method of claim 1, wherein the parameter comprises at least one of an amount of data, a sum of absolute differences (SAD) and a motion vector.

9. The method of claim 1, further comprising:
determining bit precision;
setting indication bits according to a range of the determined bit precision based on a result of the lossless compression; and
adding a same number of the set indication bits as a number of pixels to a header and generating lossless compression data.

10. An apparatus for encoding data, the apparatus comprising:
an interprediction block which performs interprediction on input data;
an intraprediction block which performs intraprediction on input data;
a lossless compression block which applies lossless compression to a raw data transfer mode included in the intraprediction block or to a separate raw data transfer mode for input data; and
a mode selection block in a processor, which compares a cost generated by the intraprediction block and a cost generated by the interprediction block with a cost generated by the lossless compression block, in order to select one of a lossless compression mode of the interprediction or a lossless compression of the intraprediction and a separate lossless compression mode.

11. The apparatus of claim 10, wherein the intraprediction block comprises:
an intra mode block which perform block prediction in a current picture using pixel data of a block that is adjacent to a current block;
a raw data transfer mode block which transfers raw data within a current macroblock without compressing the raw data; and
a lossless compression unit which performs lossless compression on and transfers the transferred raw data sequentially in an order using correlations between adjacent pixels.

* * * * *